United States Patent [19]

Tanaka et al.

[11] 4,104,649
[45] Aug. 1, 1978

[54] ADAPTOR FOR PROVIDING A DIGITAL SIGNAL INDICATING THE FULL OPEN F NUMBER OF AN INTERCHANGEABLE PHOTO-TAKING LENS IN A SINGLE LENS REFLEX CAMERA SYSTEM

[75] Inventors: Katsumi Tanaka, Kawasaki; Shigeru Hashimoto, Yokohama; Shohei Ohtaki, Yokohama; Tadashi Ito, Yokohama; Tomonori Iwashita, Fuchu; Susumu Kozuki, Yokohama, all of Japan

[73] Assignee: Canon Kabushiki Kaisha, Tokyo, Japan

[21] Appl. No.: 739,119

[22] Filed: Nov. 5, 1976

[30] Foreign Application Priority Data

Nov. 6, 1975 [JP] Japan .............................. 50-133306

[51] Int. Cl.² ............................................. G03B 17/00
[52] U.S. Cl. ................................ 354/289; 354/23 D; 354/286
[58] Field of Search ..................... 354/23 D, 286, 289

[56] References Cited

U.S. PATENT DOCUMENTS

| 3,777,640 | 12/1973 | Holderbaum | 354/289 |
|---|---|---|---|
| 3,928,858 | 12/1975 | Sakurada et al. | 354/23 D |
| 4,006,484 | 2/1977 | Nobusawa | 354/23 D |

FOREIGN PATENT DOCUMENTS

2,451,676  9/1975  Fed. Rep. of Germany ........ 354/23 D

*Primary Examiner*—Russell E. Adams
*Attorney, Agent, or Firm*—Toren, McGeady and Stanger

[57] ABSTRACT

A device adapted for the purpose of enabling the use of presently available interchangeable photographic lenses in recently developed digitalized single lens reflex camera systems. This device is constructed in the form of an adaptor attachable to and detachable from the body of an interchangeable lens mount and capable, upon attachment to a conventional interchangeable lens, of providing information representing the full open F number of the interchangeable lens in the form of a coded digital signal. This signal is applied to a digitalized camera body associated therewith and provided, for example, with an inputting device adapted to receive the full open F number of the interchangeable lens as coded digital signal.

17 Claims, 18 Drawing Figures

ADAPTOR FOR PROVIDING A DIGITAL SIGNAL INDICATING THE FULL OPEN F NUMBER OF AN INTERCHANGEABLE PHOTO-TAKING LENS IN A SINGLE LENS REFLEX CAMERA SYSTEM

BACKGROUND OF THE INVENTION

1. Field of the Invention

This invention relates to an adaptor for use in a single lens reflex camera system with interchangeable photo-taking lenses of different F numbers, and more particularly to an adaptor attachable to and detachable from the body of a presently available interchangeable lens mount and capable of providing information representing the full open F number of the interchangeable lens in the form of a coded digital signal for a digitalized camera.

2. Description of the Prior Art

The prior art provides a single lens reflex camera system, with a series of interchangeable lenses of different full open aperture value of F number. The light metering mechanism of the exemplary camera is operated with a photosensitive element positioned to receive light from a scene being photographed through the interchangeable lens associated with the camera for determining an exposure value. This light metering of the so-called TTL type is characterized in that when the photo-taking lens is interchanged with a change in full open F number, (1) the photosensitive element produces a different output despite of the fact that the level of brightness of the scene remains unchanged, because the light metering is effected always at the full open aperture; and (2) the amount of change of the light intensity on the light-receiving surface of the photosensitive element does not coincide with the change of the light intensity on the focal plane (film surface), because the exit pupil position is shifted. In order to insure that the exposure control system of the camera cooperating with such a photosensitive element produces the proper exposure value with high accuracy and reliability regardless of the change in full open F number therefore, it is necessary to render the exposure control system responsive to information representing the full open F number of the associated interchangeable lens by a suitable compensating means.

An example of the conventional design features of such compensating means is that the individual interchangeable lenses are provided with respective signal producing pins of different length depending upon the full open F number and arranged, upon selective attachment of the interchangeable lenses to a common camera body, to control the position of a signal receiving member cooperating with the exposure control system of the camera in such a manner that information in the form of a displacement of the signal receiving member by a length proportional to the full open F number of the associated interchangeable lens is factored into an exposure value.

In transmitting information of the full open F number from the associated interchangeable lens to the exposure control system in the camera body, however, the use of such a signal producing pin with the signal receiving member gives rise to a possibility of creating a relatively large information shift error, because it is practically impossible to manufacture a production run of interchangeable lenses with signal producing pins affixed to the lens mounts economically, while holding all of the dimensions of the signal producing pins to specific values. Further, the provision of the signal receiving member between the signal producing pin and the exposure control system constitutes another source of information shift error. From the standpoint of assuring high accuracy and reliability and which the exposure control system is rendered responsive to the full open F value of the associated interchangeable lens, therefore, it is very disadvantageous to employ the analog type signal transmission mechanism.

On the other hand, in recent years digital signal processing techniques have been increasingly used in photographic cameras, wherein the computation of an exposure value representing an effective aperture value or exposure time, the display of the determined exposure value, and the control of the exposure determining mechanism including the diaphragm and the shutter are carried out by use of digital circuit means. Such a digitalized camera when adapted for use with interchangeable lenses having signal producing pins is required to have additional means for converting the analog information of the full open F value to a digital one. This signal converting process constitutes still another source of information shift error.

In order to eliminate the above mentioned drawbacks, one solution has been proposed for a digital type signal transmission mechanism in U.S. Pat. No. 3,782,261, entitled "Data Transmission Device for Use with Interchangeable-Lens-Camera" in which the camera body is provided with a uniform circular array of data transmission elements arranged on an annular surface of the camera, each of which is biased towards a projected position in which it sticks out of the camera mount annular surface, but can be pushed into a retracted position, while the interchangeable lens mount is provided at its corresponding annular surface with one or more arcuate slots adapted to receive loosely selected data transmission elements when the lens is mounted in its final position on the camera, whereby the mounting of the lens on the camera is effected with the result that selected data transmission elements are received in the slot or slots and thus remain in their projected position, while other data transmission elements are pushed into their retracted position by the annular surface of the lens mount. Thus, the data to be transmitted from the lens to the camera body is determined by the particular combination of retracted and projected data transmission elements, in other words, transmission of the data is digitally carried out. The data transmission device disclosed in U.S. Pat. No. 3,782,261, however, particularly adapted for use in a camera system employing a screw mount type coupling between a camera body and an interchangeable lens, wherein the interchangeable lens is first brought into contact with the camera body at their mount surfaces, and then turned about the optical axis thereof relative to the camera body until rigidly secured thereto. This coupling method limits the apparatus to the combination of a uniform circular array of data transmission elements with one or more arcuate slots.

Unlike the data transmission system for full open F number information of the lens suited to the screw mount type lens and camera body, an alternative data transmission system for non-screw mount type lens and camera bodies has been proposed by the assignee of the present invention in U.S. Pat. application Ser. No. 621,126, filed Oct. 9, 1975, entitled "A Totally Opened F Value information Input System of Lens for a Camera with Interchangeable Lenses". According to this application, the camera body is provided with n-switch members arranged near the mounting portion thereof for mounting a photo-taking lens to receive information representing the full open F number of the lens in the form of a coded digital information of n-bits, while each of the photographic lenses made interchangeable to the common camera body is provided with a signal pin or pins arranged near the corresponding engagement portion thereof adapted to mate with said mounting portion of the camera body to mount the lens on the camera body and capable of providing information representing the full open F number of the lens as a coded digital signal of said n-bits, whereby when the photographic lens is attached to the camera body by linear operation substantially parallel to the optical axis of the lens (that is, without rotating motion of the lens) to mate the engaging portion of the lens with the mounting portion of the camera body, the n-switch members are selectively closed by the signal pin or pins depending upon the full open F number of the lens, so that the full open F number information of the taking lens is introduced into the camera body as a coded digital information of n-bits.

In this way, more recently high speed digitalization of the single lens reflex camera system proceeds with the introduction of digital techniques. In the course of development of the digitalized camera system, the old-fashioned camera bodies and the various interchangeable lenses therefor are rendered entirely unusable. In other words, camera systems employing data transmission devices and inputting systems of the above-mentioned patent application work well only when the selection of a camera body and an interchangeable lens for establishing a complete camera with an effective exposure control system satisfies the specific design feature. For example, when the old-fashioned interchangeable lens having no provision for generating the above-mentioned signal for providing the full open F number information as a coded digital signal is combined with a camera body receptive of the full open F number information of the associated lens as a coded digital signal, the inputting of the full open F number information of the lens into the camera body cannot be entirely effected. Conversely, when the old-fashioned camera body having no provision for receiving the coded digital signal is combined with a new type interchangeable lens having the signal providing means, the inputting of the full open F number information of the lens into the camera body likewise cannot be entirely effected.

On the other hand, the presently available single lens reflex camera system is constituted from a number of different types of camera bodies in combination with a wide variety of interchangeable lenses usable in common with any one of the various camera bodies. Therefore, it is very natural that the digitalization of the camera system may begin with the camera bodies as they constitute a major portion of the system. When the digitalization is directed only to the camera bodies, however, all of the old-fashioned interchangeable lenses are made obsolete, and therefore, as the digitalization of the camera body proceeds, the necessity of providing interchangeable lenses especially adapted for use with such digitalized camera bodies arises. If the public is permitted to use the old-fashioned interchangeable lenses in combination with the digitalized camera bodies a delay in the start of digitalization would result, particularly at the interface between the camera body and the interchangeable lens mount.

SUMMARY OF THE INVENTION

With the foregoing in mind, the present invention aims at eliminating all of the above-mentioned drawbacks of the conventional camera system by a very simple method.

Accordingly, the present invention has for its general object to permit the use of presently available interchangeable lenses in the course of digitalization of the camera system at the present day stage of development in a transition period toward digitalization without necessitating modification in the lens mount structure.

Another object of the present invention is to enable the presently available interchangeable lenses to be usable in combination not only with the old-fashioned camera body but also with a digitalized camera body of different design from that of the old-fashioned camera body, that is, to be usable interchangeably with these camera bodies of different design.

To achieve these objects, according to the features of the present invention, there is provided an adaptor attachable to and detachable from a lens body and having signal means for providing the full open F number information of the lens as a coded digital signal.

In other words, according to the present invention, the present available interchangeable lenses when used with the adaptor of the invention which provides the full open F number information of the lens as a coded digital signal work well with digitalized camera bodies. On the other hand, when used without this adaptor as detached therefrom, the interchangeable lenses work well with old-fashioned camera bodies in a manner known in the art.

A further object of the present invention concomitant to the foregoing objects and features is to provide an adaptor for providing the coded digital full open F number information of an interchangeable lens which adaptor is particularly of simple structure and capable of introducing the full open F number information of each interchangeable lens into the camera body without suffering from information shift error due to the deviation of the dimensions of the various constructional parts from their specific values.

These and other objects of the present invention and its features will become apparent from the following detailed description taken in conjunction with the accompanying drawings:

BRIEF DESCRIPTION OF THE DRAWINGS

FIGS. 1 to 10 show one embodiment of the adaptor according to the present invention as applied to an example of the combination of a presently available interchangeable lens and a digitalized camera body.

FIGS. 12 to 18 show another embodiment of the adaptor according to the invention as applied to an alternative example of the combination of a presently available interchangeable lens and a digitalized camera body.

DETAILED DESCRIPTION OF THE PREFERRED EMBODIMENTS

First, one embodiment of the adaptor according to the present invention and an example of the combination of an interchangeable lens and a digitalized camera body to which said adaptor is applicable will now be explained with reference to FIGS. 1 to 10.

Figure 1:
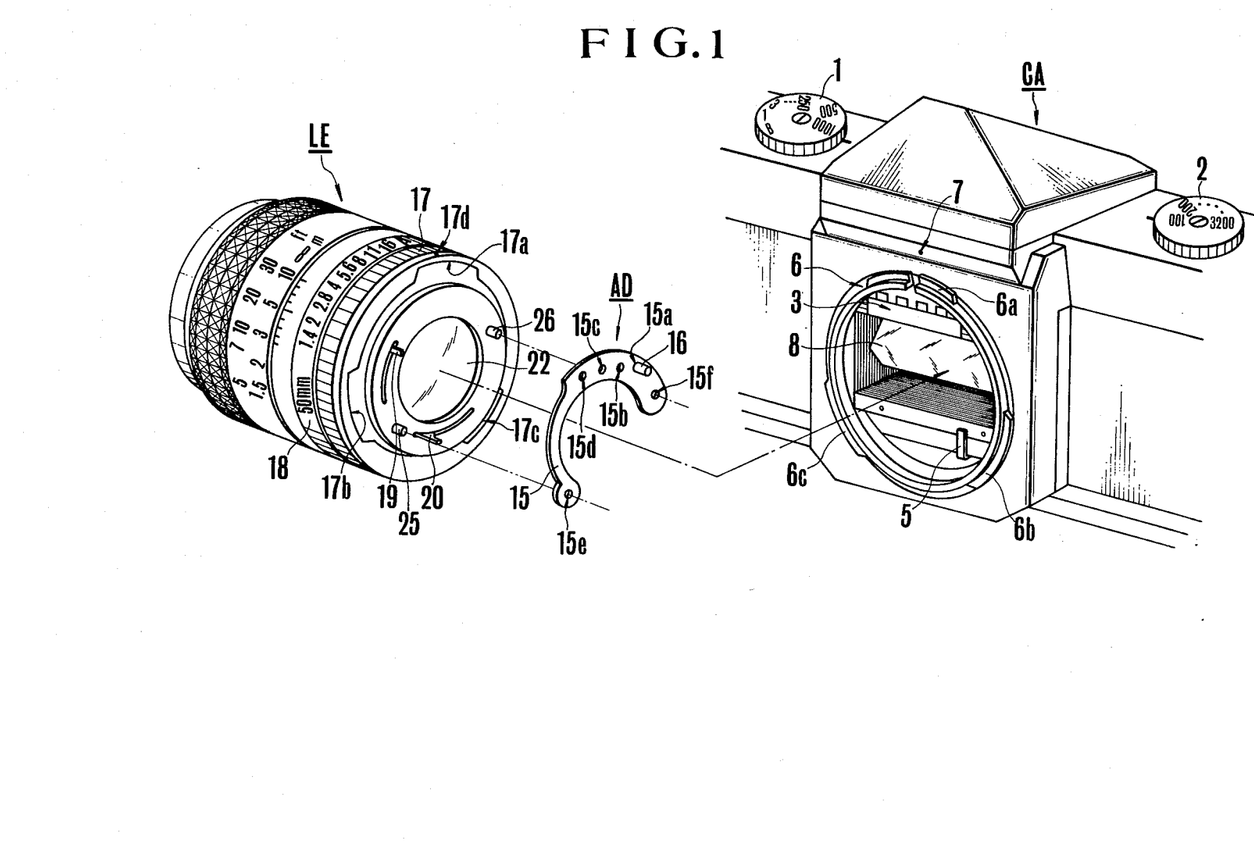
FIG. 1 is a perspective view of the adaptor, photographic and camera body shown as being about to be assembed with each other in a manner characteristic of the invention.
Figure 2:
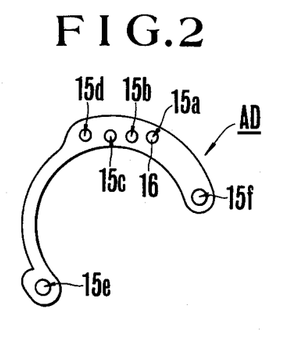
FIG. 2 is a plane view of the adaptor of FIG. 1.
Figure 3:
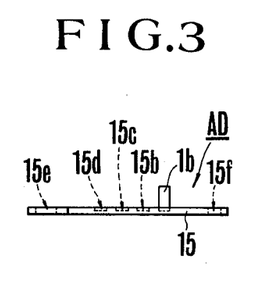
FIG. 3 is a side view of the adaptor of FIGS. 1 and 2.
Figure 4:
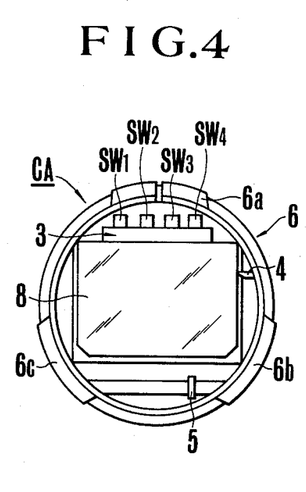
FIG. 4 is a front elevational view of the camera body of FIG. 1 particularly at the mounting portion for mounting the lend and a portion thereby surrounded.
Figure 5:
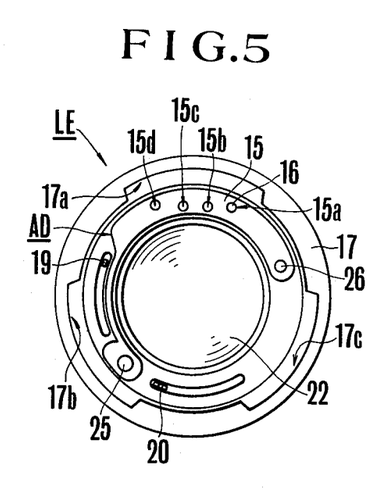
FIG. 5 is a back elevational view of the lens mount of FIG. 1 together with the adaptor of FIG. 1 attached at a location near the engaging portion of the lens mount adapted to mate with the mounting portion of the camera body.
Figure 6:
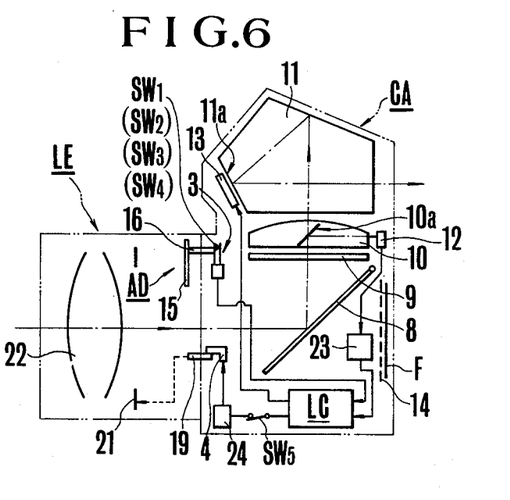
FIG. 6 is a schematic side sectional view of the camera body of FIG. 1 with the taking lens and the adaptor assembled with each other to establish an arrangement for introducing the coded digital full open F number information of the lens into the camera body.
Figure 10:
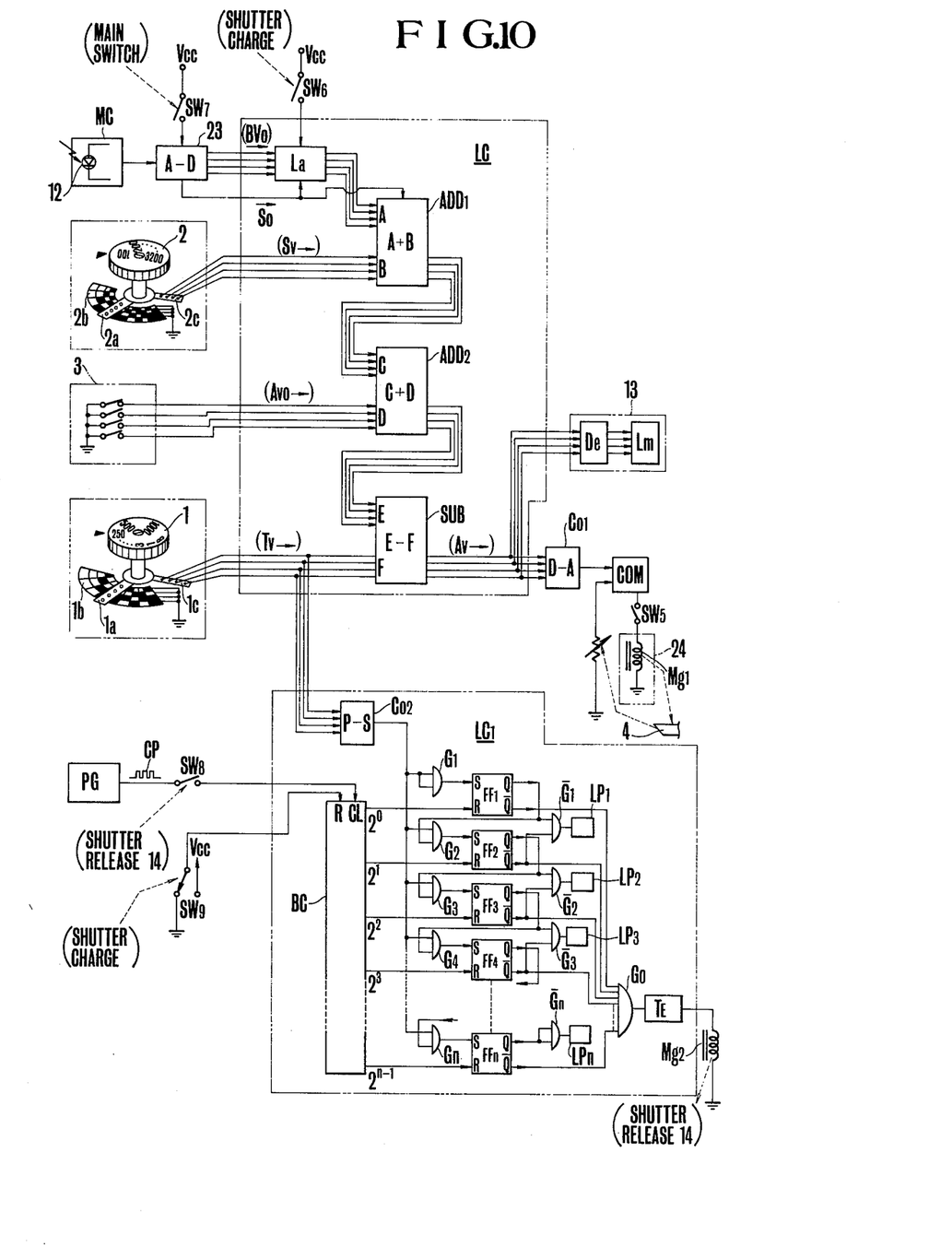
FIG. 10 is a schematic circuit diagram, partly in block form, of a digital exposure control system usable with the camera system of FIG. 1 to 9.

A conventional single lens reflex camera may be established by coupling a mechanical mounting LE for a photographic optical system 22 to a camera body CA at their respective coupling members 17 and 6 as shown in FIGS. 1 and 6, whereby a lens aperture mechanism provided in the mounting LE is operatively connected to a diaphragm control mechanism provided in the camera body CA. The camera body CA further includes a digital exposure control system the essential parts of which are shown in FIG. 10 and associated with a shutter dial 1 and a film speed dial 2, both of which are positioned on the top panel of the camera body CA. A desired shutter speed (hereinafter abbreviated as "T$v$") and the sensitivity of the used photographic film (hereinafter abbreviated as "S$v$") can be introduced into a digital exposure value computing circuit LC by these dials 1 and 2 in the form of digital signals. A switch device 3 is provided for inputting the full open F number (hereinafter abbreviated as "A$vo$") of the photo-taking lens 22 in the mounting LE as a coded digital signal of a certain number of bits into the computing circuit LC, and positioned near the coupling member 6 or the lens mount for mounting the photographic lens mounting LE as shown in FIG. 1. This switch device is shown in more detail in FIGS. 4, 7 and 8 as comprising four switches SW1 to SW4, so that the full open F number information can be processed as a 4-bit coded digital signal by the digital exposure control system.

The diaphragm control mechanism includes a diaphragm scanning lever 4 (see FIG. 4) and a diaphragm closing down lever 5, these parts being arranged to be brought into engagement with respective control pins 19 and 20 extending respectively from a diaphragm presetting ring (not shown) and from a drive lever (not shown) for the diaphragm blades through respective arcuate slots concentric to the optical axis of the optical system, or lens 22 and provided through a common inner flange of the lens mounting LE, when the lens mounting LE is coupled to the camera body CA. With the camera LE and CA switched to the shutter preselection automatic diaphragm control exposure range, it is possible that when a shutter release button (not shown) is depressed, the diaphragm aperture value (hereinafter abbreviated as "A$v$") as determined by the computing circuit LC is introduced into the diaphragm through the lever 4-and-pin 19 engagement. The diaphragm closing down lever 5 is then actuated to adjust the size of the diaphragm aperture to the preset value before a leading shutter curtain of the camera shutter 14 (see FIG. 6) begins to run down, causing initiation of exposure of a photographic film F.

A view finder optical system is shown in FIG. 6 comprising a tiltable reflex mirror 8 operable in a manner known in the art, a focusing screen 9 on which an image of the object area intended to be photographed is formed, a condenser lens 10 through which light from the image on the screen 9 passes to a penta prism 11 and therethrough to an eye-piece (not shown), and a half silvered mirror 10$a$ positioned within the condenser lens 10 at a central portion thereof and inclined with respect to the axis of the view finder optical systm at a 45° angle so that a portion of the light from the image is deflected by the half silvered mirror 10$a$ to a photosensitive element 12 positioned adjacent one side of the condenser lens 10 and constituting part of a sensor circuit MC (see FIG. 10). Responsive to light from the object entering through the photo-taking lens 22 after successive reflection from the reflex mirror 8 and the half silvered mirror 10a, the photosensitive element 12 produces an output with a magnitude proportional to the level of brightness of the object (hereinafter abbreviated as "B$vo$"). This output, or the output of said sensor circuit MC, after being converted to a digital signal by an analogue-to-digital circuit 23, is applied to the digital exposure value computing circuit LC. 13 is a display means for displaying the aperture value A$v$ determined by the digital exposure value computing circuit LC positioned in face-to-face relation to a half silvered mirror front surface 11a of the penta prism 11. 24 is a control means such as an electro-magnet (see FIG. 10) responsive to the output of the computing circuit LC for controlling the stopping operation of said diaphragm scanning lever 4 to effect automatic presetting of the diaphragm in the lens aperture mechanism. The input of the control means 24 is connected through a manually operable switch SW5 to the output of the computing circuit LC, and the switch SW5 is arranged to be closed when the control mode of the diaphragm is changed from "manual" to "automatic" control mode.

Referring now to FIG. 10, the digital exposure control system further includes a latch circuit L$a$ having four input terminals connected to the respective output terminals of the A-to-D converter 23. Upon completion of the A-D converting operation of the converter 23 which results in the production of an actuating signal So to be set for storage of information of the object brightness level B$vo$, the latch circuit L$a$ receives the digital signals from converter 23. The contents of the latch circuit La are cleared by the opening of the switch SW6 when the shutter is charged or cocked. Also forming part of the digital exposure control system are first adder ADD1 having two groups of input terminal A and B, the terminals A of which are connected to the output terminals of the latch circuit L$a$, and the terminals B of which are connected to the respective output terminals of the film speed dial 2, a film speed dial 2 having a tap 2a with four lobes arranged to slidably move on the respective tracks of a code plate 2b so that the film speed selected on the dial 2 is converted to a 4-bit digital signal S$v$, and having a function of performing a computation as expressed by the following formula:

$$S v + S v o$$

The digital exposure control system also uses a second Adder ADD2 having two groups of input terminals, the terminal C of which are connected to the respective output terminals of the first adder ADD1 and the other terminals D of which are connected to the respective switch elements of the switch device 3 and having a function of performing a computation as expressed by the following formula:

$$S v + B v o + A v o$$

In addition the digital exposure control system also employs a subtractor SUB having two groups of four input terminals each, the terminals E of which are connected to the respective output terminals of the second adder ADD2 and the other terminals F of which are connected to respective output terminals 1c of the shutter speed dial 1. The shutter speed dial 1 has a tap 1a with four lobes arranged to slidably move on the respective tracks of a code plate 1b so that the shutter speed selected on the dial 1 is converted to a 4-bit digital signal T$v$. The subtractor performs a computation as expressed by the following formula:

$$[(S v + B v o + A o) - T v] = A v$$

The parts L$a$, ADD1, ADD2 and SUB constituting the digital exposure value computing circuit LD. The output of the subtractor SUB which represents an effective aperture value A$v$ is applied to a diaphragm control circuit comprising a digital-to-analogue convertr Co1 having four input terminals connected to the respective output terminals of the subtracytor SUB for converting the digital signal to a corresponding analogue signal, and a comparator COM having two input terminals, one of which is connected to the output terminal of the converter Co1 and the other of which is connected to a variable resistor cooperating with the diaphragm scanning lever 4, so that upon coincidence of the output of the variable resistor with the output of the converter Co1, the comparator COM produces an output which is applied through a closed switch SV5 to the solenoid of an electromagnet Mg1, whereby the diaphragm scanning mechanism is clamped to effect automatic presetting of the lens aperture mechanism. The output of the subtracter SUB is also applied to the display means 13 comprising a decoder De and a light emitting member Lm.

The digital exposure control circuit further includes a shutter control circuit LC1 comprising a parallel-to-serial converter Co2 having four input terminals connected to the respective output terminals of the shutter dial 1 for producing, upon reception of the 4-bit parallel digital signal in a serial output. The exposure control circuit also uses $n$ AND gates G1 to G$n$ each having one input terminal connected to the common output terminal of the converter Co2, $n$ flip-flops FF1 to FF$n$ having "set" terminals S connected to the respective output terminals of AND gates G1 to G$n$, and having "reset" terminals R connected to respective output stages designated $2^0$ to $2^{n-1}$ of binary conunter Bc. The binary counter stages each have one output terminals $\overline{Q}$ connected to the respective next AND gates G2 to G$n$ at the other input terminal thereof, and having another output terminals Q connected to a common AND gate Go having an output terminal connected through a switching circuit Te for a shutter electromagnet Mg2. The binary counter BC is supplied at its input terminal CL with a clock pulse train from a pulse generator PG through a switch SW8 which is arranged to be closed when the shutter release button is depressed from the first to second stroke. The "reset" terminal R of the binary counter BC is connected to a movable contact of a single pole double throw switch SW9 arranged to cooperate with a shutter cocking mechanism (not shown). The shutter control circuit is provided with a display circuit for displaying the numerical value of the shutter speed. The display circuit comprises $n$ lamps LP1 to LP$n$ having input terminals connected to respective output terminals of n AND gates $\overline{G}1$ to $\overline{G}n$. Each of the AND gates G1 to G$n$ has two input terminals, one of which is connected to the output terminal $\overline{Q}$ of the one of the flip-flops FF1 to FF$n$ which has the same subscript number, and the other of which is connected to the output terminal Q of the next flip-flop, except for that of AND gate G$n$, which is connected to the other input terminal thereof.

Referring again to FIG. 1, the mounting LE for the photographic optical system 22 is shown as being of conventional structure presently available in the market and made interchangeable to the camera body CA. The lens mounting LE is provided with a coupling member 17 in the form of a clamp ring having three cutouts 17a, 17b and 17c in the rear flange thereof. The size, shape and location of each of the cutouts are such that when the lens mounting LE is brought into contact with the camera body CA at their respective coupling members 17 and 16 while maintaining a spot mark 17d on the clamp ring 17 in alignment with a spot mark 7 on the front panel of the camera body CA, the cutouts 17a, 17b and 17c are mated with respective projections 6a, 6b and 6c of the coupling member 6 of the camera body respectively. Thereafter, the clamp ring 17 may be turned by an angular distance of not more than 60° relative to the barrel, whereby the lens mounting LE can be rigidly secured to the camera body CA without a rotating motion of the inner mounting flange with the lens 22 about its optical axis. A diaphragm ring of the lens mounting LE is indicated at 18. As has been mentioned before, the lens mounting LE is provided at the inner flange with a signal producing pin 25 having a longitudinal length dependent upon the full open F value of the optical system 22 and capable of providing the full open F number information as an analogue amount. Another pin 26 is provided for adjusting the position of the various parts of the lens mounting LE when assembled with each other.

An adaptor of the present invention for assisting in utilizing the digital exposure control system of FIG. 10 with the presently available interchangeable lens mounting LE and the camera body CA is indicated at AD in FIGS. 1, 2, 3, 5 and 6. This adaptor AD is constructed from a semi-arcuate support plate 15 made of an electrically insulating material and being provided with a certain number of digital signal pins 16 made likewise of an electrically insulating material. The semi-arcuate plate 15 is provided with four holes 15a, 15b, 15c and 15d normally bored therethrough and arranged along a common horizontal line as viewed in FIG. 1 in equally spaced relation to each other, so that when the lens mounting LE with the complete adaptor AD is coupled with the camera body CA, the signal pins 16 fixedly secured in the respective holes 15a to 15d are brought into closing engagement with respective switch elements SW1 to SW4 of the switch device 3 as can be seen by comparison of FIG. 4 with FIG. 5. The number of digital signal pins 16 selected with the support plate 15 and the pattern of pin distribution indicate the full open F number of the interchangeable lens. In order that the support plate 15 is rendered attachable to and detachable from the lens mounting LE, there are provided two holes 15e and 15f bored in respective end portions of the support plate 15 and having such diameters that the analogue signal pin 25 and the position adjusting pin 26 extending from the inner flange of the lens mounting LE are engaged in the holes 15e and 15f respectively to adjust the position of a digital signal pin or pins 16 relative to the switch device 3. In order to avoid accidental detachment of the adaptor AD from the lens mounting LE, it is desirable to control the position of the holes 15e and 15f relative to the pins 25 and 26 in such a manner that a tension force is exerted in the support plate 15 to some extent under its self-resilient action when the adaptor AD is attached to the mounting LE. If there is no need to detach the adaptor AD from the mounting LE, the adaptor AD may be cemented to the mounting LE by the use of a suitable adhesive agent.

Figure 7:
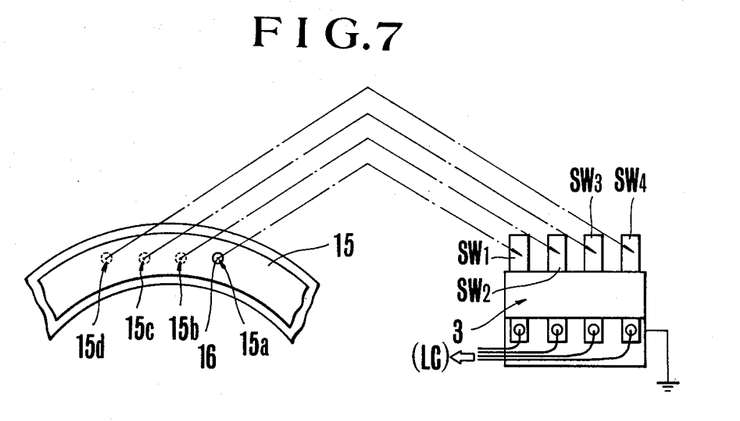
FIG. 7 is a schematic elevational view on an enlarged scale showing the relationship between a signal pin or a set of signal pins provided on the adaptor for providing the full open F number information of the lens as a coded digital information and a set of switch members provided in the camera body and adapted to selectively engage with the signal pin or pins for inputting the full open F number information as the coded digital signal.
Figure 8:
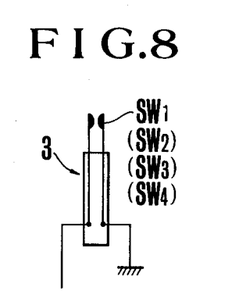
FIG. 8 is a side elevational view of each of the switch members of FIG. 7.
Figure 9:
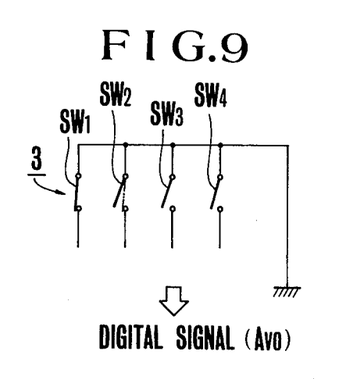
FIG. 9 is a circuit diagram of the switch members of FIG. 7.

The scheme of design of different 4-bit coded digital signals based on the different combinations of the number of digital pins 16 mounted on the single support plate 15 and the provision of the number of holes 15a, 15b, and so on, for connection with the selected pins 16 will be explained in detail below by reference to FIG. 7. As this embodiment of the invention employs a support plate 15 having four holes 15a to 15d, the maximum possible number of different 4-bit coded digital signals available is equal to $2^4$ (the fourth power of two) and these signals may be assigned to different values of the full open aperture as follows. Now assuming that a full open F number of 1.0 (hereinafter abbreviated as F.No. 1.0) is taken as reference one for which no digital signal pin 16 is employed, an adaptor having only one signal pin 16 mounted in the first hole 15a as shown in FIGS. 1 to 7 is adapted for use with an interchangeable lens having a full open F number larger than F.No. 1.0 by $2^0$ stop (or step). When the only one pin 16 is mounted in the second, third or fourth holes 15b, 15c or 15d, the corresponding interchangeable lens has a full open F number larger than F.No. 1.0 by $2^1$ stops, $2^2$ stops and $2^3$ stops respectively, in other words, it has F.No. 1.4, F.No. 2, F.No. 4 and F. No. 16.

In connection with the foregoing explanation, it should be explained that the full open F number $Avo$ of the interchangeable lens associated with the camera body CA must be factored into the exposure value as determined by the digital computing circuit LC. Letting $Bv$ denote the true level of brightness of an object being photographed, we have the following theoretical formula for exposure value computation based on the APEX method (Additive System of Photographic Exposure)

$$Bv + Sv = Tv + Av \qquad (I)$$

When the film speed value $Sv$, shutter speed value $Tv$ and true object brightness level $Bv$ are given for the camera in the shutter preselection automatic exposure mode, the aperture value is determined by the computation based on the formula (I). It is to be noted here that the object brightness level $Bv$ is given in the form of an output of the photosensitive element 12 depending upon the full open F value of the associated lens, as can be seen from FIG. 6. Therefore, in the TTL type light metering system, the output $Bvo$ of the photosensitive element 12 includes information relating to the full open F value $Avo$ of the photo-taking lens LE in addition to the true object brightness level $Bv$. As a result, the output $Bvo$ of the photosensitive element 12 is varied with the full open F value $Avo$ of the associated photographic lens and may be expressed, for example, by the following formula $$Bvo = Bv - Avo \qquad (II)$$

Accordingly, the true object brightness level $Bv$ must be determined by modifying the output $Bvo$ of the photosensitive element 12 as follows:

$$Bv = Bvo + Avo \qquad (III)$$

For this reason, it is required that the camera of the type described be provided with means for introducing information of the full open F number of the associated photographic lens into the exposure control system, so that the computation for the exposure value is performed based on the theoretical computing formula expressed by $$(Bvo + Avo) + Sv = Tv + Av \qquad (IV)$$

With the foregoing in mind, the function of the adaptor AD of the invention will next be explained in connection with the exposure controlling operation of the camera. Although the interchangeable lens mounting LE of conventional structure as shown in FIG. 1 when used with an old-fashioned camera body having a known analogue exposure control system operates with its analogue pin 25 for providing the full open F value information of the lens, it does not operate with the analogue pin 25 when used with the digitalized camera body as shown in FIG. 1. In this case, therefore, the adaptor AD of the invention must be attached to the lens mounting LE by utilizing the pins 25 and 26. The above-mentioned digital signal pin or pins of which the necessary number and location on the support plate 15 are predetermined by taking into account the full open F number or F No. of the lens 22 is or are fixedly secured to the holes 15a to 15d of the support plate 15 by frictional force or by cementing with an adhesive agent.

Next, the lens mounting LE with the adaptor AD attached thereto at the holes 15e and 15f and pins 25 and 26 may be attached to the camera body CA. During this attaching process, the clamp ring 17 is at first adjusted in angular position relative to the inner flange fixedly carrying the adaptor AD, then the lens mounting LE is brought into contact with the camera body CA while maintaining the aligned relationship between the marks 17d and 7 on the clamp ring 17 and the front panel of the camera body CA until the projection pawls 6a, 6b and 6c of the coupling member 6 of the camera body CA are inserted into the respective cutouts 17a, 17b and 17c of the coupling member 17 of the lens mounting LE, and then the clamp ring 17 is journalled to a predetermined angular position about the axis of the lens 22, whereby the lens mounting LE is rigidly secured to the camera body CA. During this coupling process, the adaptor AD is also brought into engagement with the switch device 3 in the camera body CA as shown in FIG. 6, whereby one or more switch elements, in this instance, only one switch element SW1 indicating F. No. 1.4 of the lens, is or are closed by the signal pin or pins, in this instance, only one pin 16 mounted in the first holed 15a to introduce the full open F number Avo of the photographic lens 22 as a digital signal into the digital exposure value computing circuit LC as shown in FIG. 10. Further, the diaphragm scanning lever 4 and diaphragm closing down lever 5 of the camera body CA are also brought into engagement with the diaphragm signal pin 19 and the diaphragm blade control pin 20 respectively of the lens mounting LE.

Next, the shutter speed dial 1 and film speed dial 2 may be manipulated to set both a desired shutter speed Tv and the sensitivity of the film used Sv as digital signals into the computing circuit LC. With the thus-conditioned camera, when a main switch (not shown) is closed, the switch SW7 is closed in automatic response thereto causing initiation of operation of the A-D converter 23, whereby the analogue output of the sensor circuit MC is converted to a corresponding digital signal. At the termination of duration of the A-D converting time period, the A-D converter 23 produces a signal So by which the latch circuit La of the computing circuit LC is actuated to store the digital output Bvo of the A-D converter 23, and also by which the adder ADD1 is actuated to perform the computation (Sv + Bvo) based on the outputs of the latch circuit La and the film speed setting means 2, 2a, 2b and 2c. When the computing operation of the adder ADD1 is completed, the second adder ADD2 is actuated to perform the computation (Sv + Bvo + Avo) based on the outputs of the first adder ADD1 and the switch device 3. Thereafter, the subtracter SUB is actuated to perform the computation [(Sv + Bvo + Avo) − Tv] based on the outputs of the second adder ADD2 and the shutter speed setting means 1, 1a, 1b and 1c. The output of the subtracter SUB, representing the effective aperture value Av, is applied to the display means 13 by which the operator looking through the view finder is informed of the numerical value of the computer result Av to which the lens aperture mechanism of the lens mounting LE is to be adjusted automatically or manually. If the operator desires to make an exposure in the manual diaphragm control mode, the switch SW5 will be opened to disconnect the comparator COM from the control means 24, and then the diaphragm ring 18 will be turned to select a diaphragm value as indicated by the display means 13. For the automatic diaphragm control mode, the diaphragm ring 18 will be turned to place a mark "A⇄" (auto) in registry with an index to close the switch SW5. When the shutter release button is depressed to the first stroke, the diaphragm scanning mechanism is actuated to control the automatic adjustment of the diaphragm presetting ring (not shown) in accordance with the output of the subtracter SUB as the control means 24 is rendered responsive to the output of the comparator COM.

The operation of the shutter control circuit LC1 is as follows. Responsive to the output of the shutter speed setting means 1, 1a, 1b and 1c, the parallel to serial converter Co2 produces a pulse train which is applied to the AND gates G1 to Gn. At the initial state of the converter Co2 where no pulse is produced, all of the flip-flops FF1 to FFn are reset so that the output at the terminals Q is "0", while the output at the terminal $\bar{Q}$ is "1". Upon the generation of a first pulse from the converter Co2, as the first pulse is allowed to pass through only one of the AND gates G1 to Gn, namely, the first AND gate G1, the first flip-flop FF1 is triggered to produce outputs of "1" and "0" appearing at the terminals Q and $\bar{Q}$ thereof respectively, whereby the second AND gate G2 is gated on. Upon the generation of a second pulse passing through the second AND gate G2, the second flip-flop FF2 is triggered to produce outputs of "1" and "0" at the Q and $\bar{Q}$ terminals respectively. Such triggering operation of the flip-flop network repeats itself until the number of flip-flops triggered into a "set" state becomes equal to the number of pulses produced by the comparator Co2 depending upon the shutter speed selected on the shutter dial 1. Now assuming that the k-th flip-flop FFk is finally triggered, the k-th display lamp LPk only is energized to display the shutter speed value.

The binary counter BC is reset when the shutter is cocked to effect instantaneous switching of SW9 to the terminal "b". In this state, therefore, the binary counter BC produces no output which is applied to the flip-flop circuit. When the shutter release button is depressed to the first stroke, the diaphragm scanning and closing down levers 4 and 5 are successively actuated to adjust the size of diaphragm aperture in accordance either with the output of the computing circuit LC or with the diaphragm value preselected by the diaphragm ring 18. Then the reflex mirror 8 is moved from its viewing-position to its non-viewing position, after which, at the further depression of the shutter release button to the second stroke, the shutter 14 is released causing the front shutter curtain to run down and simultaneously causing closure of switch SW8, whereby a clock pulse train of a predetermined frequency is applied from the pulse generator PG to the binary counter BC. Now assuming that the period of time of the clock pulses CP is equal to one millisecond (1/1000 second), a resetting signal appears at the first output stage $2^0$ of the binary counter BC after a time interval of 1/1000 second from the initiation of opening movement of the shutter and is applied to the reset terminal of the first flip-flop FF1, whereby the first flip-flop FF1 is triggered to produce the outputs of "0" and "1" at the Q and $\bar{Q}$ terminals respectively. Assuming further that the number of pulses supplied from the comparator Co2 is four, the first four flip-flops FF1 to FF4 are in the set state, and the fifth flip-flop FF5 and those that follow are in the reset state. As the output stages $2^0, 2^1, \ldots, 2^{n-1}$ of the binary counter BC are connected to the respective flip-flops FF1 to FFn, when the binary counter BC has counted $2^3$ clock pulses, the fourth flip-flop FF4 is reset, whereupon the AND gate GO is gated on to trigger the switching circuit TE for energization of the shutter magnet Mg2, controlling the period of actuation of the shutter 14. The actual exposure time is made equal to $2^3 \times 1/1000 = 1/125$ second.

Figure 11:
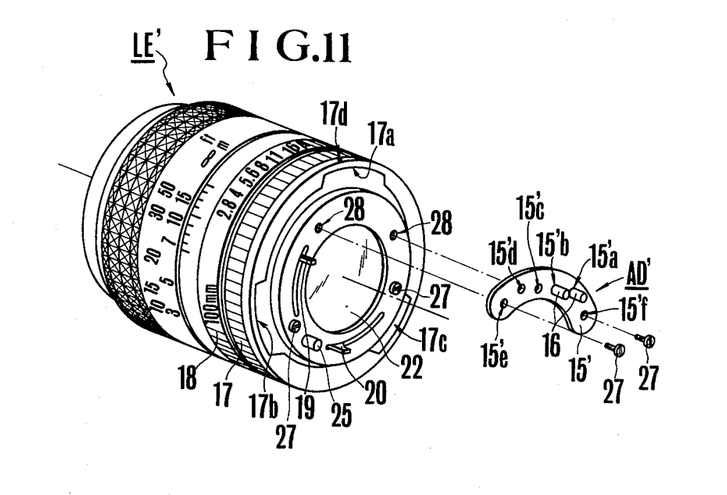
FIG. 11 is a perspective view of a photographic lens of the same construction as in FIG. 1 with an example of modification of the adaptor of FIGS. 1, 2, 3 and 5 being attached thereto in a different manner from the above.

FIG. 11 shows an example of modification of the adaptor AD shown in FIGS. 1, 2, 3 and 5. In this example, the adapter AD' is designed to utilize a pair of screws of which the primary purpose is to establish the lens assembly instead of the pins 25 and 26 in attaching the adaptor AD' to the lens mounting LE' in rigidly secured relation thereto. In the interchangeable lens mounting LE' shown in FIG. 11, 27 is the pair of screws for use in establishing the lens assembly, and 28 is a pair of screw-threaded holes for the screws 27. The adapter AD' for providing the digital full open F number information is provided with a pair of holes 15'e and 15'f formed in respective end portions of a support plate 15 and receptive of the screws 27 therethrough.

As the full open F number of the optical system 22 in the lens mounting LE' is F No. 2.8, two digital signal pins 16 are employed with the single support plate 15' and the first and second holes 15'a and 15'b are selected for mounting of these signal pins. Accordingly, the adaptor AD' of FIG. 11 provides information relating to a full open F number larger than F No.1.0 by ($2^0$ + $2^1$) stops, that is, F No. 2.8. When the lens mounting LE' with the adaptor AD' attached thereto by means of the screws 27 passing through the holes 15'e and 15'f **into the screw-threaded holes 28 is coupled with the camera body of FIG. 1, only two of the four switch elements SW1 to SW4, namely, the first and second switch elements SW1 and SW2 are closed to introduce the full open F number of the associated lens 22 as a digitally coded signal into the exposure control system of FIG. 10. The other parts of the lens mounting LE' are similar in construction and arrangement to those of the lens mounting LE shown in FIG. 1.

Referring to FIGS. 12 to 18, there is shown another embodiment of the adaptor according to the present invention as applied to another example of the combination of an interchangeable lens mounting having a structure different from that of the lens mounting shown in the FIGS. 1 to 11 embodiment and a digitalized camera adapted for use with such interchangeable lens mounting, wherein the same reference characters have been employed to denote ports similar to those shown in FIGS. 1 to 11. While the single lens reflex camera system of FIGS. 1 to 11 is characterized by attaching an interchangeable lens mounting to a camera body a linear operation substantially parallel to the optical axis (that is, without rotating motion of the lens body), the following single lens reflex camera system is characterized by the necessity of rotating motion of the interchangeable lens mounting about the optical axis thereof relative to the camera body during the attaching and coupling process. In this respect, the adaptor of the invention is designed to suit such a different coupling process.

Figure 12:
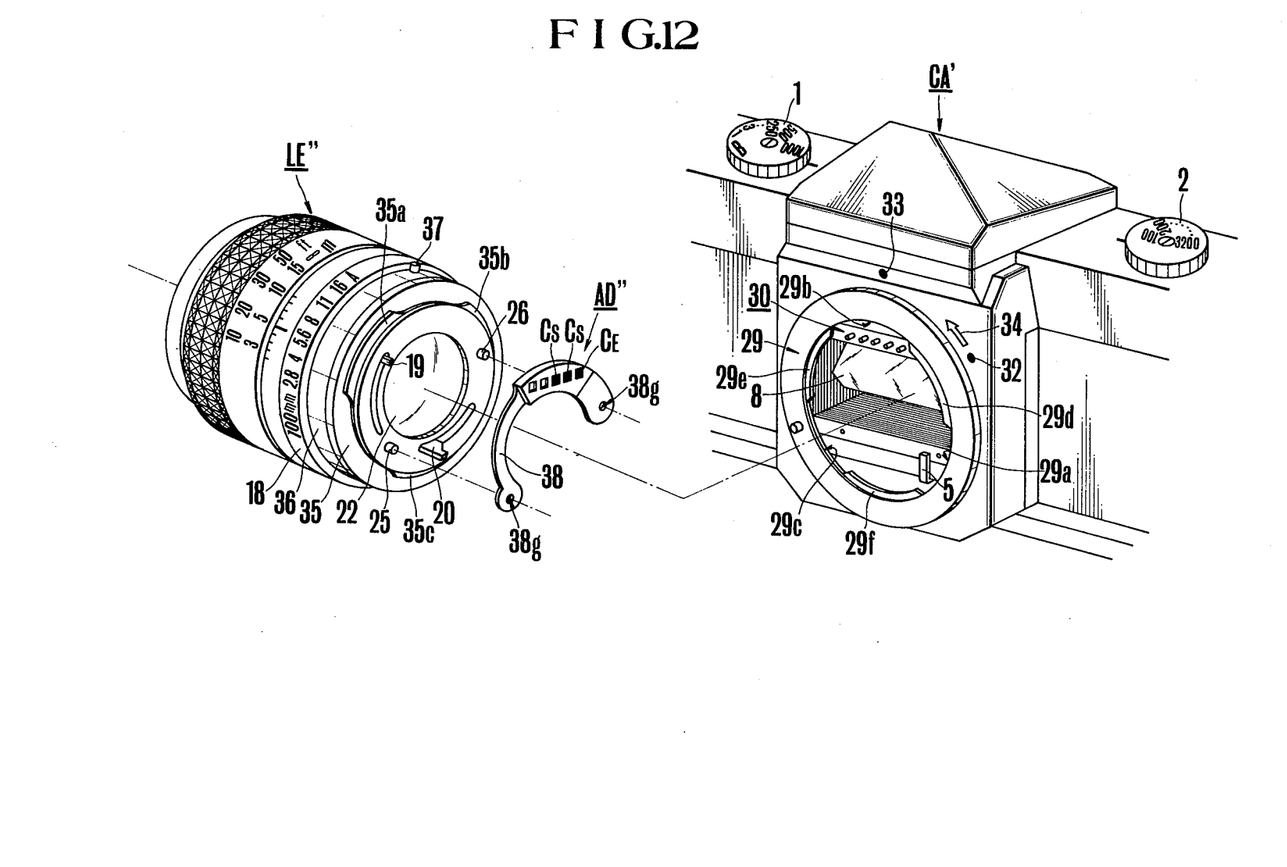
FIG. 12 is a perspective view of the adaptor, taking lens and camera body shown as being about to be assembled with each other in a manner characteristic of the invention.

Referring first to FIG. 12, the camera body CA' is similar in construction to the camera body CA of FIG. 1 except for a mounting portion for mounting the lens and an inputting device for inputting the full open F number information of the lens. This mounting portion is indicated at 29 (also see FIG. 15) and shown as having three arcuate recessed portions 29a, 29b and 29c concentric to each other and formed in the inner edge of a common ring in 120° spaced relation and having three arcuate projection pawls 29d, 29e and 29f concentric to each other and to the recessed portions 29a to 29c and each formed between the successive two recessed portions 29a to 29c.

Figure 17:
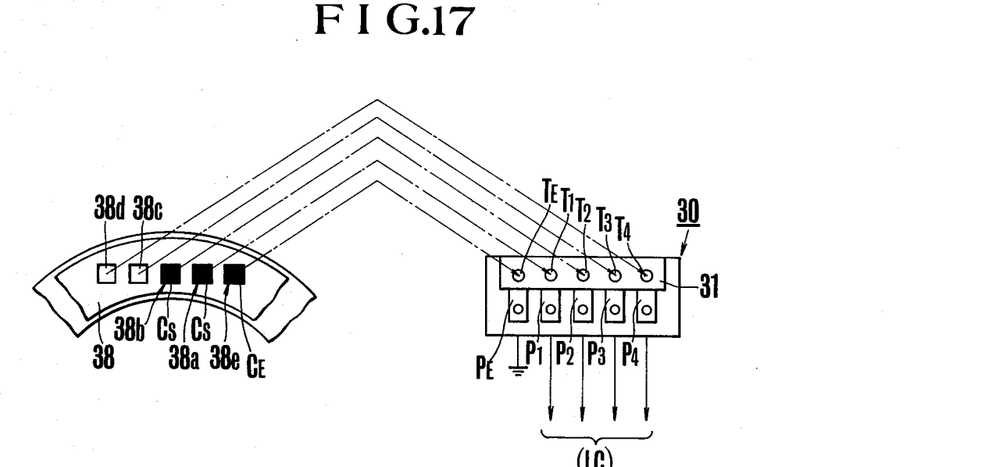
FIG. 17 is a fragmentary schematic elevational view on an enlarged scale showing the relationship between a conductive chip or a set of conductive chips on the adaptor for providing the full open F number information of the lens as the coded digital signal and a set of terminal members provided in the camera body and adapted to selectively contact with the conductive chip or chips for inputting the full open F number information as the coded digital signal.
Figure 18:
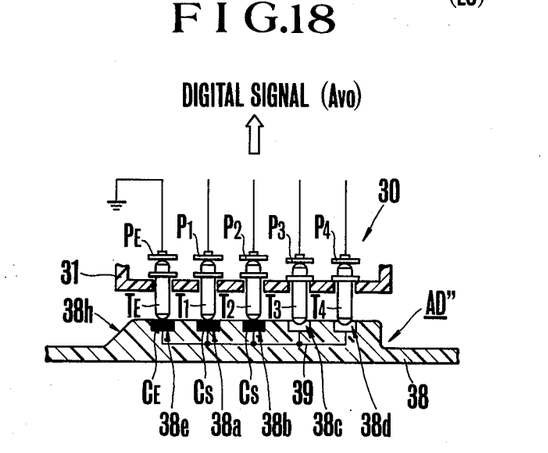
FIG. 18 is a fragmentary sectional view of the adaptor of FIG. 12 engaged with inputting means provided in the camera body for receiving the coded digital full open F number information of the lens.

The details of the inputting device which is generally indicated at 30 are shown in FIGS. 17 and 18 as comprising an electrically insulating frame structure 31, and five movable terminal members Te and T1 to T4 extending through respective holes provided through the frame structure 31 and arranged along a common line in equally spaced relation to each other to be brought into contact with respective square-shaped conductive chips or square-recessed portion of the adaptor AD" of the invention to be described in more detail later when the lens mounting LE" is coupled with the camera body CA'. The terminal member TE is adapted for ground and the other terminal members T1 to T4 are adapted for inputting the full open F number information of the lens as a coded digital signal of 4-bits. The inputting device further utilizes four conductive plate springs PE and P1 to P4 tending to urge the respective terminal members TE and T1 to T4 toward the front as viewed in FIG. 12, the plate spring PE being grounded and the other plate springs P1 to P4 being connected to the digital exposure value computing circuit LC by way of respective leads. The inputting device 30 is positioned near the engaging portion 29.

Referring again to FIG. 12, the interchangeable lens mounting LE" is similar in construction to the lens mounting LE of FIG. 1 except for an engaging portion to be adapted to mate with the mounting portion 29 of the camera body CA'. This engaging portion is constructed in the form of a ring 35 fixedly mounted on the main tube 36 and having three arcuate projection pawls 35a, 36b and 35c concentric to each other and engageable with the projection pawls 29d to 29f of the mount portion 29 of the camera body CA'. The lens mounting LE" may be attached to the camera body CA' at their respective coupling portions 35 and 29 while maintaining a position indicating pin 37 radially extending from the main tube 36 in alignment with an index mark 32 provided on the camera body CA', whereby the projection pawls 35a to 35c are caused to enter the recessed portions 29a and 29c respectively. Thereafter, the lens mounting LE" is bodily turned about the axis of the optical system 22 in a direction indicated by an arrow mark 34 until the position indicating pin 37 is placed in registry with another index mark 33 provided on the camera body CA' at an upper center point thereof.

Figure 13:
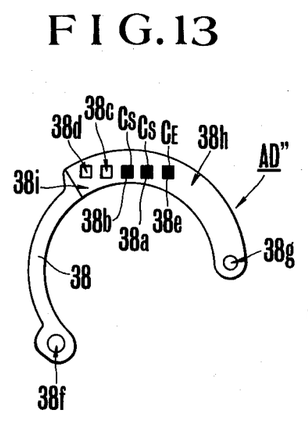
FIG. 13 is a plane view of the adaptor of FIG. 12.
Figure 14:
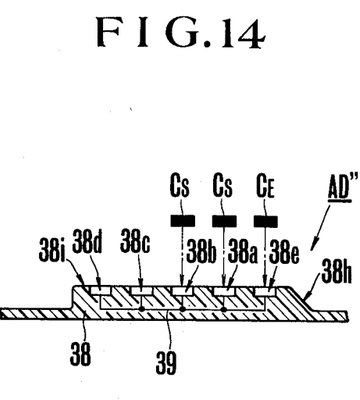
FIG. 14 is a side sectional view of the adaptor of FIGS. 12 and 13 showing the detailed construction thereof.
Figure 15:
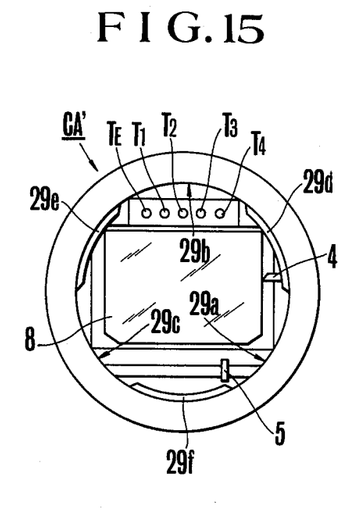
FIG. 15 is a front elevational view of the camera body of FIG. 12 particularly at the mounting portion for mounting the lens and a portion surrounded thereby.
Figure 16:
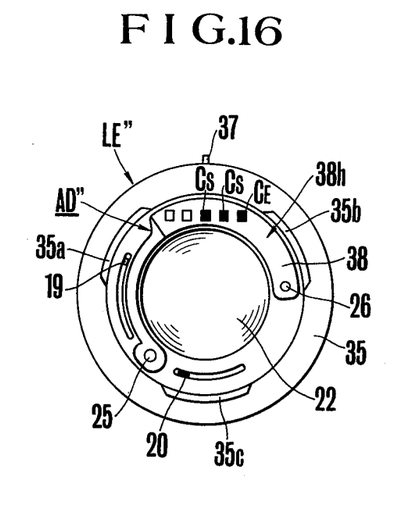
FIG. 16 is a back elevational view of the lens mount of FIG. 12 together with the adaptor of FIG. 12 attached at a location near the engaging portion of the lens mount adapted to made with the mounting portion of the camera body.

An adaptor of the invention for assisting in the establishment of a digital exposure control system for use with a conventional interchangeable lens mounting LE" adapted for a conventional analogue exposure control system and a digitalized camera body CA' is generally indicated at AD". The details of this adaptor AD" are shown in FIGS. 13 and 14, comprising an electrically insulating semi-arcuate support plate 38 having five square-shaped recessed portions 38a to 38e arranged on a cmmon line to receive respective terminal members T1 to T4 except for the ground terminal member TE when the coupling between the lens mounting LE" and the camera body C'" has been completed, one conductive chip CE permanently fitted in the recessed portion 38e, and one or more conductive chips or chips for producing the full open F number information of the lens as a coded digital signal of 4-bits. In order that the adapter AD" is attached to and detached from the lens mounting LE", there is provided a pair of holes 38f and 38g formed in respective end portions of the adaptor AD" and rigidly engageable with the respective pins 25 and 26 provided on the inner flange of the lens mounting LE" contiguous with the coupling member 35 as shown in FIG. 16. As the lens mounting LE" is turned in a clockwise direction as viewed from the rear of the camera during the coupling process, the support plate 38 is provided with a tapered portion formed at the leading edge 38h of a chip-carrying bank 38i as shown in FIG. 14, so that upon clockwise movement of the adaptor AD" adjacent the inputting device 30 during the coupling process, all of the terminal members PE and P1 to P4 are successively slid on the signal pattern surface by camming engagement with the tapered portion 38h. Each of the recessed portions 38a to 38e is provided with a conductive lead 39 buried in the bank 38i.

The number of chips Cs employed with the single support plate 38 and the selection of the mounting recessed portions 38a to 38d for the employed chip or chips depend upon the full open F number of the associated interchangeable lens as has been described in connection with the first embodiment of the invention. The mounting of the chip in the recessed portion may be effected by suitable means such as frictional force or cement without introducing electrical insulation between the earth chip CE and the signal chip Cs. When the lens mounting LE" with the adaptor AD" attached thereto through the pin 25-and-hole 38f connection and pin 26-and-hole 38g connection is coupled with the camera body CA', the ground chip CE is always brought into contact with the ground terminal member TE of the inputting device 30 of the camera body CA', while one or more signal chips Cs are brought into selectively contact with the signal terminal members T1 to T4 of the inputting device 30 for inputting the full open F number information of the lens 22 in the mounting LE" as the coded digital signal of 4-bits. Accordingly, the use of an adaptor AD" of the construction described above makes it possible to introduce the full open F number information of the associated lens as a coded digital information of 4-bit into the digital exposure value computing circuit LC, as the signal terminal members T1 to T4 are selectively grounded.

Next, the function of the adaptor AD" will be explained in connection with the inputting device 30. Now assuming that an interchangeable lens of F No.2.8 is selected for combination with the digitalized camera body CA' and that the lens mounting LE" is adapted for use with an old-fashioned camera body different from that shown in FIG. 12 and having an analogue exposure control system, an adaptor AD" having two signal chips Cs fitted in the first and second recessed portions 38a and 38b is selected for attachment to the lens mounting LE" by having the holes 38f and 38g engaged with the respective pins 25 and 26. Thereafter, the lens mounting LE" is brought into attachment with the camera body CA' at their respective coupling members, namely, the engaging portion 35 of the mounting LE" and the mounting portion of the camera body CA', while aligning the pin 37 with the index mark 32, and then turned about the axis of the lens 22 relative to the camera body CA' in the counter-clockwise direction as indicated by the arrow mark 34, whereby the projection pawls 35a to 35c are engaged with the projection pawls 29d to 29f respectively. During the movement of the lens mounting LE" from the position when the pin 37 is aligned with the mark 32 to the position where the pin 37 is aligned with the mark 33, all of the terminal members TE and T1 to T4 of the inputting device 30 are slightly retracted against the force of the place springs PE and P1 to P4 by the tapered surface 38h and brought into abutting engagement on the signal pattern surface of the adaptor AD". At the terminal position of the lens mounting LE", these terminal members TE, T1 and T2 are in alignment with the respective chips CE and Cs, while the other terminal members T3 and T4 are in alignment with the recessed portions 38c and 38d respectively as shown in FIG. 18, whereby the two signal terminal members T1 and T2 are grounded to effect introduction of a digital signal Avo into the digital exposure control system.

According to the present invention, the full open F member of the associated photo-taking lens is input into the camera body by the adaptor. In this connection, it should be further explained that, as has been mentioned before, the TTL-metering type camera provides different light values $Bvo$ as sensed by the photosensitive element with different full open F number $Avo$, as the output of the photosensitive element varies as a function of full open F number expressed, for example, by the formula II described above. In order to compensate this deviation, it becomes necessary to introduce the full open F value of the associated photo-taking lens into the exposure control system, and the above described embodiments of the invention are just adapted for this purpose. In addition to this necessity, the change in the full open F number gives rise to a further problem in that the degree of variation of the light intensity on the light-receiving surface of the photosensitive element with respect to the full open F number does not coincide with that of variation of the light intensity on the focal plane or film surface This constitutes a further source of photographic information shift error. This problem becomes serious particularly when the full open F number is small, in other words, when a bright lens is selected for combination with the camera body. Letting $Avc$ denote such light value shift error, the output $Bvo'$ of the photosensitive element may be defined by the formula $$Bvo' = Bv - Avo - Avc \qquad (V)$$

Putting the formula (I) into this formula (V), we have $$[Bvo' + (Avo + Avc)] + Sv = Tv + Av \qquad (VI)$$

Hence, information representing this light value shift error must be introued into the exposure control system. By taking into account the fact that the light value shift error Avc is an almost linear function of the full open F number Avo however, it is possible to modify the adaptors AD, AD' and AD'' of the invention in a manner to produce a signal representing (A$vo$ + A$vc$) which is to be introduced into the digital exposure control system such as that shown in FIG. 10.

As has been described in greater detail, the adaptor of the invention though having a very simple structure is capable of introducing information representing the full open F number of an interchangeable lens associated with a camera body in the form of a digital signal directly into a digital exposure control system provided in the camera body without causing migration of light value shift errors and other photographic information shirt errors to the signal processing which might otherwise result when such information is transmitted in the form of an analogue signal and when the analogue signal is converted to a digital signal. Further, there is an advantage to the user who possesses conventional interchangeable lenses provided with no signal means for introducing the above identified signal into the camera body, as the user is permitted to use a new camera body having the above mentioned ON-OFF switching mechanism for combination with the conventional interchangeable lenses. In other words, the user who has newly obtained a camera body having the above-mentioned ON-OFF switching mechanism together with the adaptor of the invention can acquire a digitalized camera system with the conventional interchangeable lenses which he already possesses.

In the above mentioned embodiments of the invention, the exposure value computing circuit is described and shown as being of digital type, but it is of course possible to use an analog type computing circuit instead.

What is claimed is:

1. An adaptor for extablising the use of a conventional interchangeable photographic lens in combination with a digitalized camera body which is provided with an inputting device for inputting the full open F number information of said photographic lens as a coded digital signal of n-bits, said adaptor comprising:
   supporting means attachable to said photographic lens in rigidly secured relation at a predetermined position; and
   k-signal members, wherein k represents an integer from 0 to n inclusive, for providing said full open F number information of the photographic lens as the coded digital signal of said $n$-bits, said signal members being disposed on said supporting means and having n setting positions on the supporting means and being able to provide $2^n$ different digital signals corresponding to $2^n$ different combinations of positions of said signal members, and being adapted to actuate said inputting device of the camera body for inputting the full open F number information of the photographic lens as the coded digital signal of said n-bits when the photographic lens is mounted on the camera body, whereby it is made possible to use a conventional interchangeable photographic lens in combination with a digitalized camera body.

2. An adaptor according to claim 1, wherein said camera body has:
   a mounting portion for mounting the photographic lens, wherein said inputting device is disposed near said mounting portion, and wherein said photographic lens having:
   an engaging portion adapted to mate with said mounting portion of the camera body to mount the photographic lens on the camera body, wherein said adaptor is rigidly mountable near said engaging portion at a position corresponding to said inputting device of the camera body.

3. An adaptor according to claim 2, wherein said photographic lens has:
   position-determining means disposed near said engaging portion and adaptable for rigidly securing said adaptor in a predetermined position; and said supporting means of the adaptor has:
   fixturing means engageable with said position-determining means of the photographic lens, whereby when said fixturing means is engaged with said position-determining means, said adaptor is rigidly secured to said photographic lens near said engaging portion at said position corresponding to said inputting device of the camera body.

4. An adaptor according to claim 3, wherein said position-determining means of said photographic lens includes:
   an analogue signal pin for providing the full open F number information as an analogue amount; and said fixturing means of said supporting means of the adaptor includes:
   one engaging hole engageable with said analogue signal pin.

5. An adaptor according to claim 3, wherein said position-determining means of said photographic lens includes:
   at least one screw member; and said fixturing means of said supporting means of the adaptor includes:
   at least one engaging hole engageable with said screw member.

6. An adaptor according to claim 3, wherein said position-determining means of said photographic lens incudes:
   at least two fixedly disposed pin members; and said fixturing means of said supporting means of the adaptor includes:
   two engaging holes engageable with the respective said two pin members.

7. An adaptor according to claim 1, wherein said inputting device of the camera body has:
   $n$-switch members so as to input the full open F number information of the taking lens as a coded digital signal of said n-bits, and wherein said k-signal members of the adaptor are constructed in the form of:
   $k$-pin members adapted to selectively actuate said switch member of the inputting device according to the n-bit digital code.

8. An adaptor according to claim 7, wherein said supporting means has:
   $n$ supporting holes for supporting said $k$-pin members in a predetermined pattern; and wherein said k-pin members are fixedly disposed on said supporting means by utilizing said supporting holes selected according to the code for providing the n-bit digital full open F number information.

9. An adaptor according to claim 1, wherein said inputting device of the camera body has:
n-signal terminal members so as to input the full open F number information of the photographic lens as a coded signal signal of said n-bits; wherein said k-signal member of the adaptor is constructed in the form of:
k-signal conductive chips adapted to selectively connect said signal terminal members of the inputting device to the ground contact according to the n-bit digital code.

10. An adaptor according to claim 9, wherein said inputting device of the camera body further has:
an ground terminal member electrically connected to the camera body ground and adapted to connect said signal terminal members to the ground contact, and wherein the adaptor further comprises:
a ground conducting chip adapted to connect said k-signal chips to the ground contact, said ground conducting chip being disposed on said supporting means and electrically connected to the k-signal chips, and adapted to be electrically connected with said ground terminal member of the inputting device for connecting the selected signal terminals selected by said k-signal chips to the ground contact when the photographic lens is mounted on the camera body.

11. An adaptor according to claim 10, wherein said supporting means has:
one supporting recess for supporting said ground conducting chip at a controlled location; and
n supporting recesses for supporting said k-signal chips at predetermined locations, whereby said k-signal chips are fixedly disposed on said supporting means by utilizing said n supporting recesses for the signal chips according to the code for providing the n-bit digital full open F number information.

12. An adaptor according to claim 11, wherein said supporting means further includes:
electrical conductive path means for electrically connecting said n supporting recesses for the signal chips to said supporting recess for said ground conducting chip.

13. In a camera system comprising a camera body and an interchangeable photographic lens, said camera body being provided with a mounting portion for mounting said photographic lens and an inputting device for inputting a full open F number information of the photographic lens, said inputting device being fixedly disposed near said mounting portion and having n-switch members so as to input the full open F number information as a coded digital signal of n-bits, and said photographic lens having an engaging portion adapted to mate with said mounting portion of the camera body to mount the photographic lens on the camera body, an adaptor for establishing the use of said photographic lens in combination with said camera body comprising:
supporting means rigidly mountable at a predetermined position of said engaging portion; and signal means for providing the full open F number information of the photographic lens to said inputting device as the coded digital signal of said n-bits, said signal means being gixedly disposed on said supporting means and including:
k-signal members, wherein k represents an integer from 0 to n inclusive, for selectively actuating said switch members of said inputting device, said signal members having n setting positions on said supporting means and being able to provide $2^n$ different signals corresponding to $2^n$ combinations of actuations of said signal members, and being gixedly disposed on the supporting means at positions corresponding to said switch members so as to be adapted to actuate said switch members when the photographic lens is mounted on the camera body, whereby it is being made possible by the adaptor to use said interchangeable photographic lens in combination with said camera body.

14. In a camera system comprising a camera body and an interchangeable photographic lens, said camera body being provided with a mounting portion for mounting said photographic lens and an inputting device fro inputting the full open F number information of the photographic lens, said inputting device being fixedly disposed near said mounting portion and having n-signal terminal members so as to input the full open F number information as a coded digital signal of n-bits; and said photographic lens having an engaging portion adapted to mate with said mounting portion of the camera body to mount the photographic lens on the camera body, an adaptor for extablishing the use of said photograhic lens in combination with said camera body, said adaptor comprising: supporting means rigidly mountable near said engaging portion at a predetermined position; and signal means for providing the full open F number information of the photographic lens to said inputting device as the coded digital signal of said n-bits, said signal means being fixedly disposed on said supporting means and including: k-signal conductive members, wherein k represents an integer from 0 to n inclusive, to connect each of said signal terminal members of said inputting device to the ground contact, said signal conductive members having n setting positions on said supporting means and being able to provide $2^n$ different signal combinations corresponding to $2^n$ different combinations of the setting positions of the signal conductive members, and being fixedly disposed on the supporting means at positions corresponding to said signal terminal members so as to be adapted to contact with said signal terminal members when the photographic lens is mounted on the camera body, whereby it being made possible by said adaptor to use said interchangeable photographic lens in combination with said camera body.

15. In a camera system comprising a camera body and an interchangeable photographic lens which is attachable to and detachable from said camera body, a system for inputting the full open F number information of the photographic lens into the camera body comprising in combination: an inputting device for inputting the full open F number information of the lens into the camera body as a coded digital signal of n-bits, said inputting device being fixedly disposed on the camera body; and an adaptor for providing the full open F number information of the photographic lens as the coded digital signal of said n-bits, said adaptor being attachable to and detachable from said photographic lens and comprising:
supporting means attachable to and detachable from said photographic lens, said supporting means being rigidly mountable at a predetermined position of said photographic lens; and signal means for providing the full open F number information of the photographic lens to said inputting device as the coded digital signal of said n-bits, said signal means being fixedly disposed on said supporting means and including:

K-signal members, wherein k represents an integer from 0 to n inclusive, having n setting positions on the supporting means and being able to provide $2^n$ different signal combinations corresponding to $2^n$ combinations of setting positions of said signal members, and being fixedly disposed on the supporting means at positions corresponding to said inputting device so as to be adapted to actuate said inputting device when the photographic lens is mounted on the camera body, whereby the full open F number information of the photographic lens is supplied to the camera body as the coded digital signal of n-bits.

16. In a camera system comprising a camera body and an interchangeable photographic lens, said camera body having a 1st mounting portion for mounting said photographic lens, and said photographic lens having a 2nd mounting portion adapted to mate with said 1st mounting portion to mount the photographic lens on said camera body, a system for inputting a full open F number information of the photographic lens to the camera body comprising in combination:

an inputting device for inputting said full open F number information of the photographic lens into the camera body, said inputting device being fixedly disposed near said 1st mounting portion of the camera body and having:

n-switch members adapted to input the full open F number information as a coded digital signal of n-bits, an adaptor for providing the full open F number information of the photographic lens as the coded digital signal of said n-bits, said adaptor being attachable to and detachable from said photographic lens and comprising:

supporting mans attachable to and detachable from said photographic lens; said supporting means being rigidly mountable near siad 2nd mounting portion of said photographic lens in a predetermined position signal means for providing the full open F number information of the photographic lens to said inputting device as the coded digital signal of said n-bits, said signal means being fixedly disposed on said supporting means and including:

k-signal members, wherein k represents an integer from 0 to n inclusive, adapted to selectively actuate each of said switch members of the inputting device, said signal members having n setting positions on said supporting means and being able to provide $2^n$ different signals corresponding to $2^n$ combinations of actuations of said switch members and being fixedly disposed on the supporting means at positions corresponding to said switch members so as to be adapted to actuate said switch members when the photographic lens is mounted on the camera body, whereby the full open F number information of the photographic lens is supplied to the camera body as coded digital signal of n-bits.

17. In a camera system comprising a camera body and an interchangeable photographic lens, said camera body having a 1st mounting portion for mounting said photographic lens, and said photographic lens having a 2nd mounting portion adapted to mate with said 1st mounting portion to mount the photographic lens on said camera body, a system for inputting said full open F number information of the photographic lens into the camera body comprising in combination: an inputting device for inputting said full open F number information of the photographic lens into the camera body, said inputting device being fixedly disposed near said 1st mounting portion of the camera body and having:

n-signal terminal members adapted to input the full open F number information as a coded digital signal of n-bits, and an adaptor for providing the full open F number information of the photographic lens as the coded digital signal of said n-bits, said adaptor being attachable to and detachable from said photographic lens and comprising:

supporting means attachable to and detachable from said photographic lens; said supporting means being rigidly mountable near said 2nd mounting portion of said photographic lens in a predetermined position; and signal means for providing the full open F number information of the photographic lens to said inputting device as the coded digital signal of said n-bits, said signal means being fixedly disposed on said supporting means and including:

k-signal conductive members, wherein k represents an integer from 0 to n inclusive, to connect each of said signal terminal members of said inputting device to the ground contact, said signal conductive members having n setting positions on the supporting means and being able to provide $2^n$ different signals corresponding to $2^n$ different combinations of said setting positions, and being gixedly disposed on the supporting means at positions corresponding to said signal terminal members so as to be adapted to contact with said signal terminal members when the photographic lens is mounted on the camera body, whereby the full open F number information of the photographic lens is supplied to the camera body as a coded digital signal of $n$-bits.

* * * * *